(12) United States Patent
Oyama

(10) Patent No.: US 9,096,027 B2
(45) Date of Patent: Aug. 4, 2015

(54) MANUFACTURING METHOD FOR HONEYCOMB-LIKE STRUCTURAL BODY, AND THE HONEYCOMB-LIKE STRUCTURAL BODY

(75) Inventor: Hiroyuki Oyama, Gotemba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 1093 days.

(21) Appl. No.: 13/133,185

(22) PCT Filed: Dec. 14, 2009

(86) PCT No.: PCT/IB2009/007748
§ 371 (c)(1),
(2), (4) Date: Jun. 7, 2011

(87) PCT Pub. No.: WO2010/070413
PCT Pub. Date: Jun. 24, 2010

(65) Prior Publication Data
US 2011/0262692 A1    Oct. 27, 2011

(30) Foreign Application Priority Data
Dec. 16, 2008    (JP) .................................. 2008-319777

(51) Int. Cl.
*B29D 24/00*    (2006.01)
*B29C 70/30*    (2006.01)
(Continued)

(52) U.S. Cl.
CPC ............ *B29D 24/005* (2013.01); *B29C 33/485* (2013.01); *B29C 70/30* (2013.01);
(Continued)

(58) Field of Classification Search
CPC .. B29C 43/18; B29C 70/30; B32B 2307/736; B32B 2305/076; B32B 2305/024

USPC ........ 428/116–118, 34.9, 320.2; 156/85, 197, 156/205, 212, 285, 292, 711, 307.1, 273.5, 156/273.7, 244.22; 264/166, 171.1, 345, 264/347, 317, 313, 257
See application file for complete search history.

(56) References Cited

U.S. PATENT DOCUMENTS 3,530,021 A * 9/1970 Reichl ............................ 156/206
4,090,002 A * 5/1978 Rosenblum ................... 428/116
(Continued)

FOREIGN PATENT DOCUMENTS

DE    40 06 354 A1    9/1991
JP    58-119813        7/1983
(Continued)

OTHER PUBLICATIONS

International Search Report in International Application No. PCT/IB2009/007748; Mailing Date: Oct. 19, 2010.
(Continued)

*Primary Examiner* — David Sample
*Assistant Examiner* — Nicholas W Jordan
(74) *Attorney, Agent, or Firm* — Finnegan, Henderson, Farabow, Garrett & Dunner, LLP

(57) ABSTRACT

A preform is formed by stacking core elements that are coated with prepregs. By heating the preform at a temperature at which the core elements do not thermally shrink, the prepregs are preliminarily hardened, and prepregs that are in contact with each other are caused to adhere to each other. Then, the prepregs are definitively hardened and the core elements are thermally shrunk by heating the preform at a temperature at which the core elements thermally shrink.

9 Claims, 10 Drawing Sheets

(51) Int. Cl.
  *B32B 38/00* (2006.01)
  *B32B 27/04* (2006.01)
  *B31D 3/02* (2006.01)
  *B29C 33/48* (2006.01)
  *B29D 99/00* (2010.01)
  *B31D 3/00* (2006.01)

(52) U.S. Cl.
  CPC ............ *B29D99/0089* (2013.01); *B31D 3/002* (2013.01); *B31D 3/0223* (2013.01); *B32B 27/04* (2013.01); *B32B 38/0036* (2013.01); *B32B 2305/076* (2013.01); *B32B 2307/736* (2013.01); *Y10T 428/24149* (2015.01)

(56) References Cited

U.S. PATENT DOCUMENTS

| 4,155,970 | A | * | 5/1979 | Cassell | 264/342 R |
| 4,681,724 | A | * | 7/1987 | Faiz et al. | 264/317 |
| 8,607,944 | B2 | * | 12/2013 | Shimokawa | 188/378 |
| 2001/0001409 | A1 | | 5/2001 | Weight et al. | |
| 2009/0202780 | A1 | * | 8/2009 | Loszewski et al. | 428/117 |

FOREIGN PATENT DOCUMENTS

| JP | 6-312473 | 11/1994 |
| JP | 2001-9942 | 1/2001 |
| JP | 2008-68487 | 3/2008 |

OTHER PUBLICATIONS

Written Opinion of the International Searching Authority in International Application No. PCT/IB2009/007748; Mailing Date: Oct. 19, 2010.

Micromet Instruments, Inc. Newsletter, "Software Enhancements," vol. 2, No. 3 (2 pages) (Apr. 1988).

Eumetric Version 7 Software Manual (Micromet Instruments, Inc.), pp. III-IV, 77-78, 90-91, and 96 (Dec. 1989).

* cited by examiner

MANUFACTURING METHOD FOR HONEYCOMB-LIKE STRUCTURAL BODY, AND THE HONEYCOMB-LIKE STRUCTURAL BODY

CROSS-REFERENCE TO RELATED APPLICATIONS

This application is a national phase application of International Application No. PCT/IB2009/007748, filed Dec. 14, 2009, and claims the priority of Japanese Application No. 2008-319777, filed Dec. 16, 2008, the contents of both of which are incorporated herein by reference.

BACKGROUND OF THE INVENTION

1. Field of the Invention

The invention relates to a manufacturing method for a honeycomb-like structural body in which a plurality of cell portions are arranged in a honeycomb fashion, and to the honeycomb-like structural body.

2. Description of the Related Art

A known manufacturing method for a honeycomb-like structural body is described in, for example, Japanese Patent Application Publication No. 6-312473 (JP-A-6-312473). In this manufacturing method, adhesive is applied in a pattern of streaks to a surface of each prepreg, and such prepregs are stacked so that adjacent prepregs have a positional relation in which the prepregs are shifted from each other by a half pitch of the streak pattern of adhesive. Then, after the stack of prepregs is heated to harden the prepregs, the stack is expanded in the stacking direction. Thus, a honeycomb-like structural body is manufactured.

However, in the foregoing honeycomb-like structural manufacturing method, the sites of prepregs that need to be expanded (hereinafter, referred to as, "expansion sites") are likely to be inadvertently fixed by the adhesive. Therefore, in order to ensure that such expansion will be properly performed, it is usually necessary to secure the separation characteristic of the expansion sites by using, for example, a separation film, or the like. Hence, there is a risk of complicating the manufacturing processes.

Besides, in the foregoing honeycomb-like structural body manufacturing method, since the prepregs stacked as described above are expanded, the shape of cell portions usually is a generally hexagonal shape. Hence, it is difficult to form various shapes of cell portions.

SUMMARY OF THE INVENTION

Accordingly, the invention provides a honeycomb-like structural body manufacturing method that is capable of easily manufacturing various honeycomb-like structural bodies that vary in the shape of cell portions, and also provides a honeycomb-like structural body manufactured by the method.

A first aspect of the invention is a manufacturing method for a honeycomb-like structural body, wherein the honeycomb-like structural body has a honeycomb-like arrangement of a plurality of cell portions, the method including: a stacking process of forming a stack by stacking thermo-shrinkable members that are coated with prepregs; a preliminary hardening process of, after the stacking process, preliminarily hardening the prepregs and adhering the prepregs that contact each other by heating the stack at a first temperature; and a definitive hardening process of, after preliminary hardening process, definitively hardening the prepregs in the stack and shrinking the thermo-shrinkable member by heating the stack at a second temperature that is higher than the first temperature.

The first temperature may be a temperature at which the thermo-shrinkable member does not shrink, and the second temperature may be a temperature at which the thermo-shrinkable member shrinks.

In the foregoing first aspect, the stack is heated in the preliminary hardening process at a temperature at which the thermo-shrinkable member does not shrink. Therefore, the prepregs in this stack become semi-hardened, and a rigidity against a certain load is developed. Therefore, when in the later-performed definitive hardening process, the prepregs are definitively hardened and the thermo-shrinkable members are thermally shrunk and therefore reduce their own volumes, spaces in the cell portions are formed while the shape of the prepregs is kept as the shape of the cell walls. Therefore, according to the first aspect of the invention, the cell portions can be formed to have a desired shape according to the shape of the thermo-shrinkable members, by providing or defining the shape of the cell portions in the manufacturing process. Hence, it becomes unnecessary to expand the stack, or to secure separation characteristic of the sites of expansion. Hence, it becomes possible to easily manufacture various honeycomb-like structural bodies that vary in the shape of cell portions.

Besides, in the preliminary hardening process, the stack may be heated so that a hardening depth of the prepregs is 10% or greater. In this case, in the definitive hardening process performed afterwards, the shape of the prepregs can be kept as the shape of cell walls.

Besides, in the stacking process, the stack may be formed by forming a plurality of intermediary bodies in which the thermo-shrinkable members disposed side by side are coated with the prepregs so as to form a wave shape, and by stacking the intermediary bodies symmetrically about a plane. In this case, it becomes possible to manufacture a honeycomb-like structural body that has high space efficiency by restraining useless superimposition of prepregs.

Besides, in the stacking process, coated elements may be formed by coating the thermo-shrinkable members with a first prepreg, and may be coated with a second prepreg, and then may be stacked. In this case, a honeycomb-like structural body in which cell portions are arranged inside cell portions is manufactured. Hence, a honeycomb-like structural body having a complicated shape of cell portions can easily be manufactured.

A second aspect of the invention is a honeycomb-like structural body manufactured by the foregoing manufacturing method, the honeycomb-like structural body including: a plurality of first cell portions that are defined by first cell walls, and that are arranged in a honeycomb fashion; and a plurality of second cell portions which are defined by second cell walls, and at least two of which are arranged within each of the first cell portions.

This honeycomb-like structural body can easily be manufactured by the foregoing manufacturing method.

In the foregoing honeycomb-like structural body, the first cell portions may have a quadrangular prism shape, and the second cell portions may have a triangular prism shape. In this case, it becomes possible to heighten the structure efficiency of the honeycomb-like structural body.

According to the foregoing aspects of the invention, it becomes possible to easily manufacture various honeycomb-like structural bodies that vary in the shape of cell portions.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
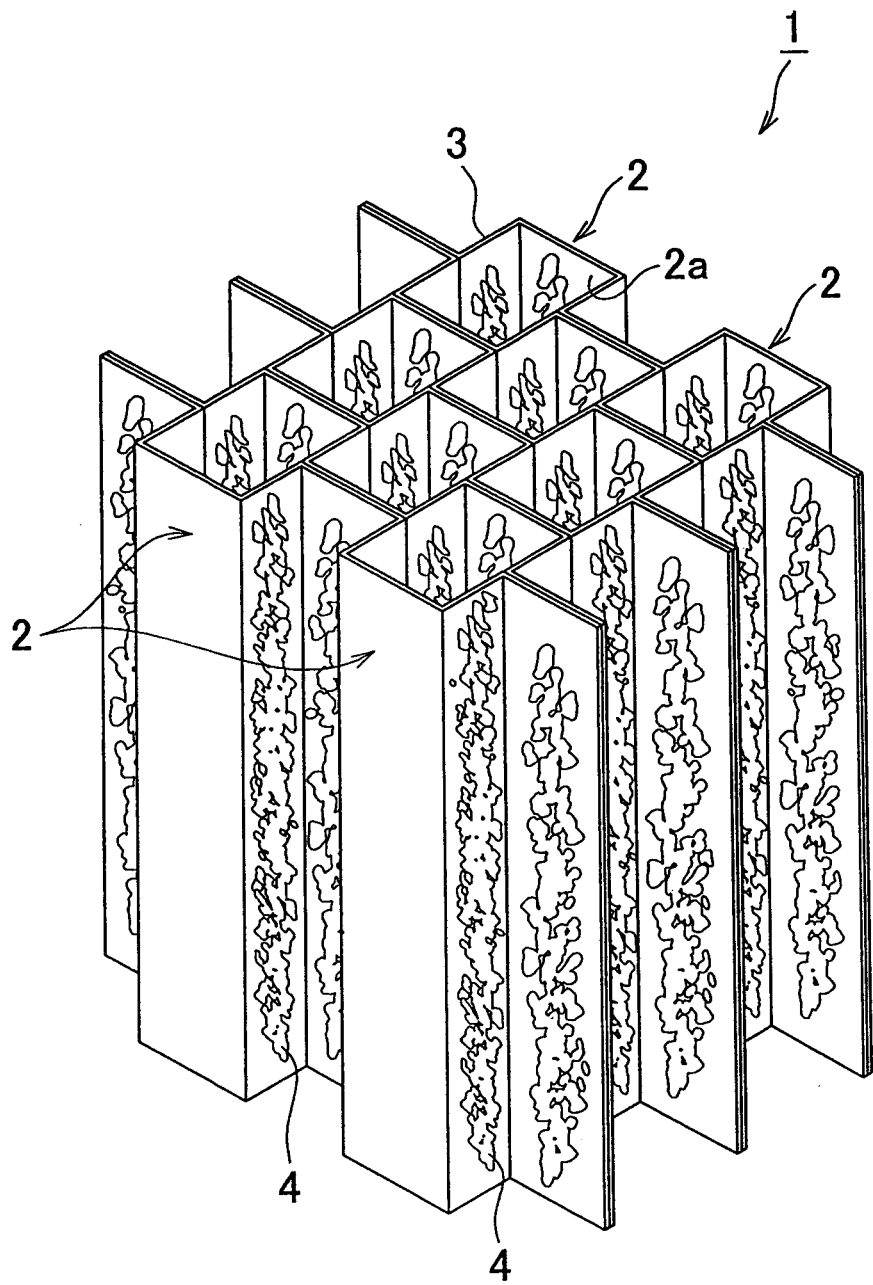
FIG. 1 is a perspective view showing a honeycomb-like structural body that is manufactured by a manufacturing method in accordance with a first embodiment of the invention.

Embodiments of the invention will be described in detail with reference to the accompanying drawings. In the description below, the same or comparative components are denoted by the same reference characters, and redundant descriptions are omitted.

First Embodiment

A manufacturing method for a honeycomb-like structural body in accordance with a first embodiment of the invention. Firstly, a honeycomb-like structural body manufactured by the manufacturing method in accordance with the first embodiment will be described.

FIG. 1 is a perspective view showing a honeycomb-like structural body that is manufactured by the manufacturing method in accordance with the first embodiment of the invention. As shown in FIG. 1, a honeycomb-like structural body 1 constructed for, for example, absorbing energy at the time of collision or the like, has a generally rectangular parallelepiped external shape.

The honeycomb-like structural body 1 has a plurality of quadrangular prism-shape cell portions 2 that are arranged in a honeycomb fashion, and is provided with cell walls 3 that define the cell portions 2. Each cell portion 2 has a cell hole 2a that is quadrangular in cross section. The cell walls 3 are formed from, for example, fiber reinforced plastic (FRP).

Incidentally, in the honeycomb-like structural body 1 shown in FIG. 1, a polystyrene foam-made core element 4 for use for a manufacturing method described below remains within each cell hole 2a.

Figure 2:
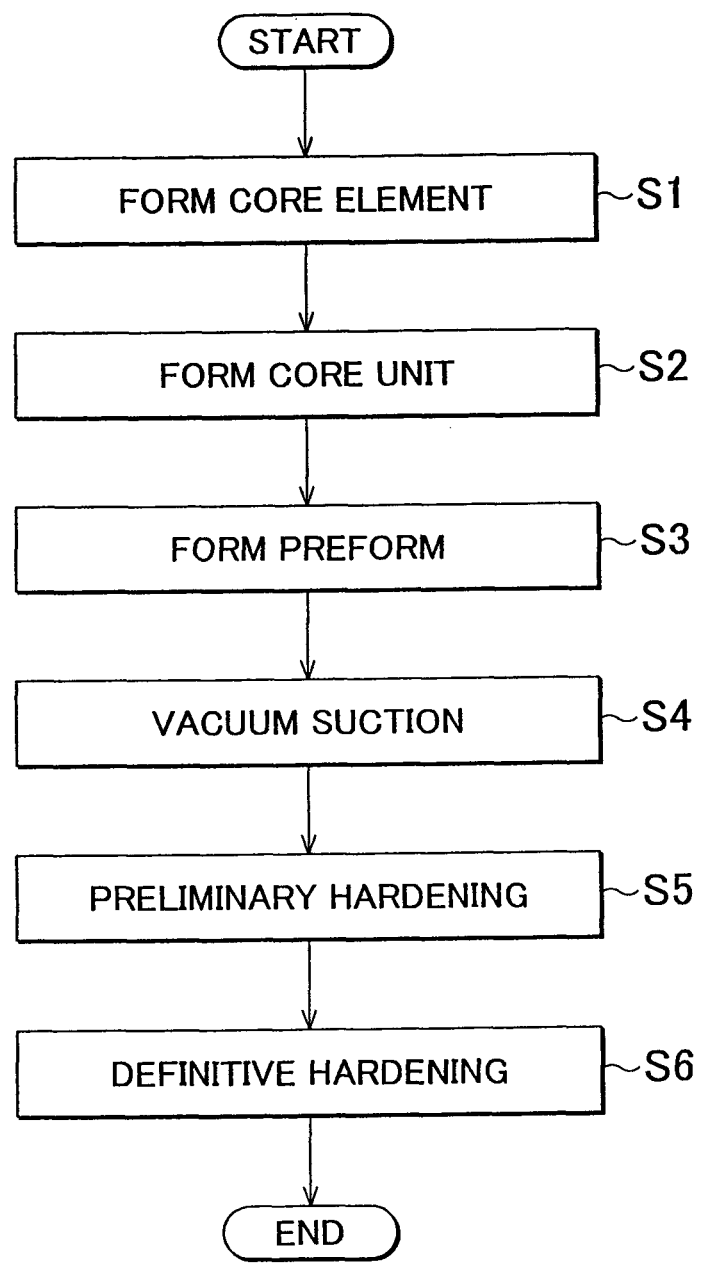
FIG. 2 is a flowchart for describing the manufacturing method for the honeycomb-like structural body shown in FIG. 1.

Next, a manufacturing method for the foregoing honeycomb-like structural body 1 will be described in detail with reference to the flowchart shown in FIG. 2.

Firstly, a plurality of quadrangular prism-shape core elements 4 having a quadrangular cross-sectional shape that is obtained by half-dividing the cross-sectional shape of a cell hole 2a are formed by dividing a polystyrene foam material (S1). The core elements 4 function as thermo-shrinkable members that have thermal shrinkability. Polystyrene foam that forms the core elements 4 is generally considered to have an expansion ratio of 30 to 45:1. The expansion ratio herein is preferred to be relatively low in order to restrain the core elements 4 from softening in a preliminary hardening process described below, and is therefore set at 30:1.

Besides, the polystyrene foam material is formed by a technique of, for example, an extrusion process, a beads process, etc. The polystyrene foam forming technique that is preferred to be used herein is the beads process since the process facilitates the thermal shrinkage of the core elements 4 in a definitive hardening process described below.

Figure 3:
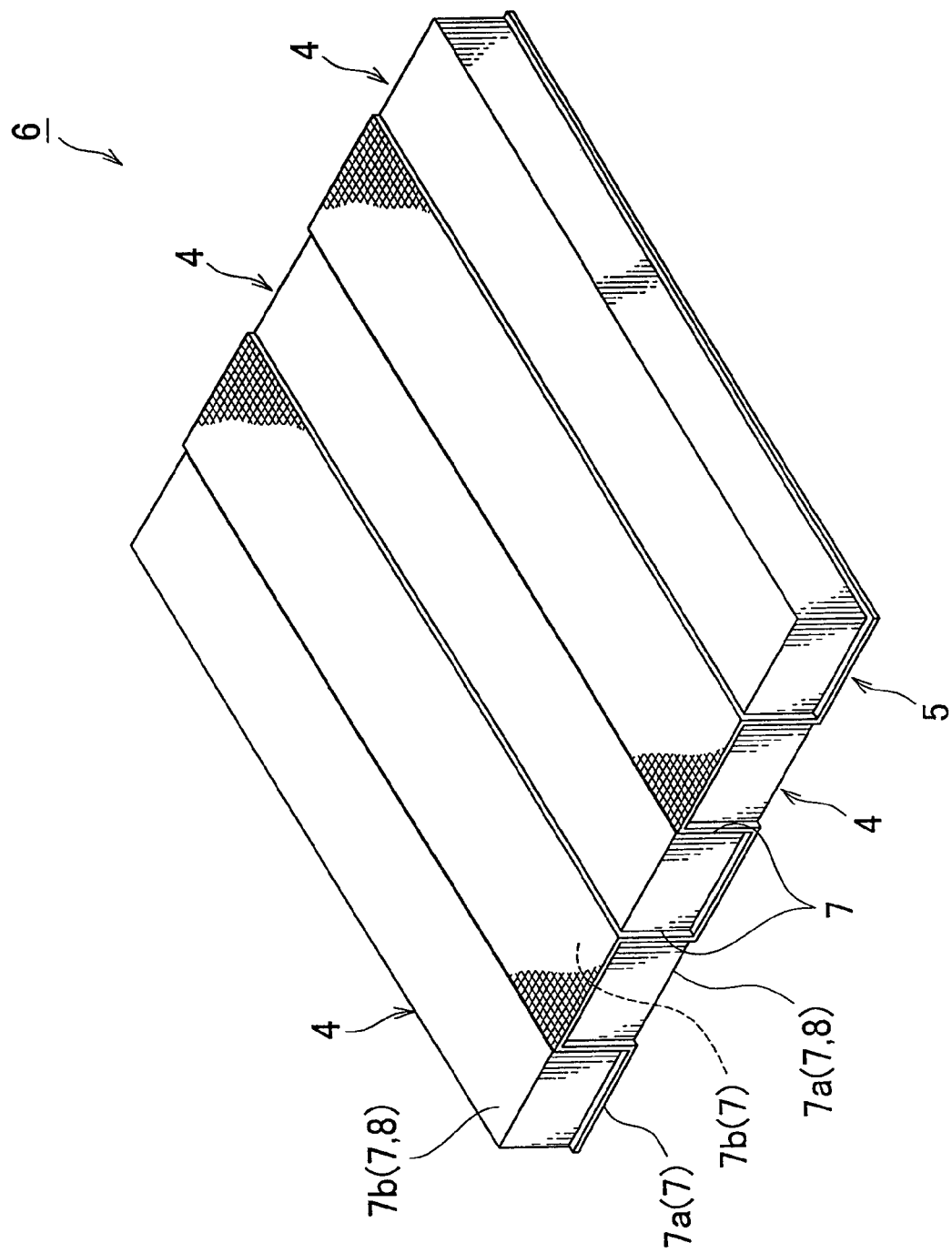
FIG. 3 is a perspective view showing a core unit in the manufacturing method for the honeycomb-like structural body shown in FIG. 1.
Figure 4:
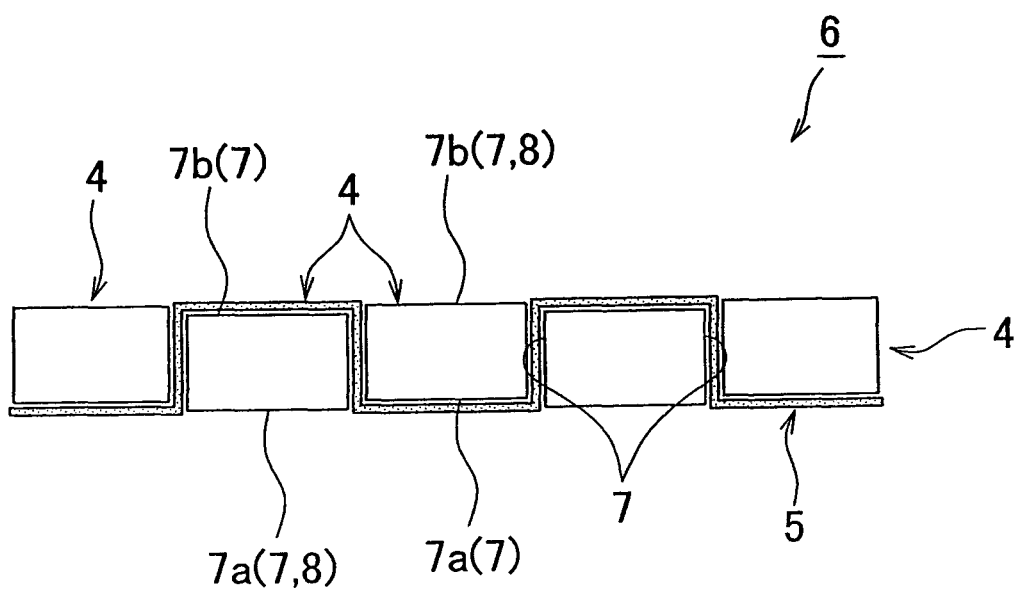
FIG. 4 is a side view of the core unit in the manufacturing method for the honeycomb-like structural body shown in FIG. 1.

Subsequently, as shown in FIGS. 3 and 4, a plurality of core elements 4 are juxtaposed, and a sheet-shape prepreg 5 is laid as a coat on the core elements so as to form a wave shape (ridge-and-groove shape). Thus, a core unit (intermediary body) 6 is formed (S2).

Concretely, as shown in FIG. 4, the prepreg 5 is laid as a coat on the juxtaposed core elements 4 so that one-side side surfaces 7a of every other core element 4 and the opposite-side side surfaces 7b of the other core elements 1 that face the one-side side surfaces 7a are exposed alternately in the juxtaposing direction. In other words, the prepreg 5 is laid as a coat in a wave shape so as to cover the side surfaces 7 of each core element 4 except for a side surface 8 thereof.

Herein, the prepreg 5 has a hardening temperature that is in the range of 80° C. to 130° C. The hardening temperature of the prepreg 5 herein is preferred to be relatively low in order to restrain the core elements 4 from softening in the preliminary hardening process described below, and therefore is set at 80° C.

Figure 5:
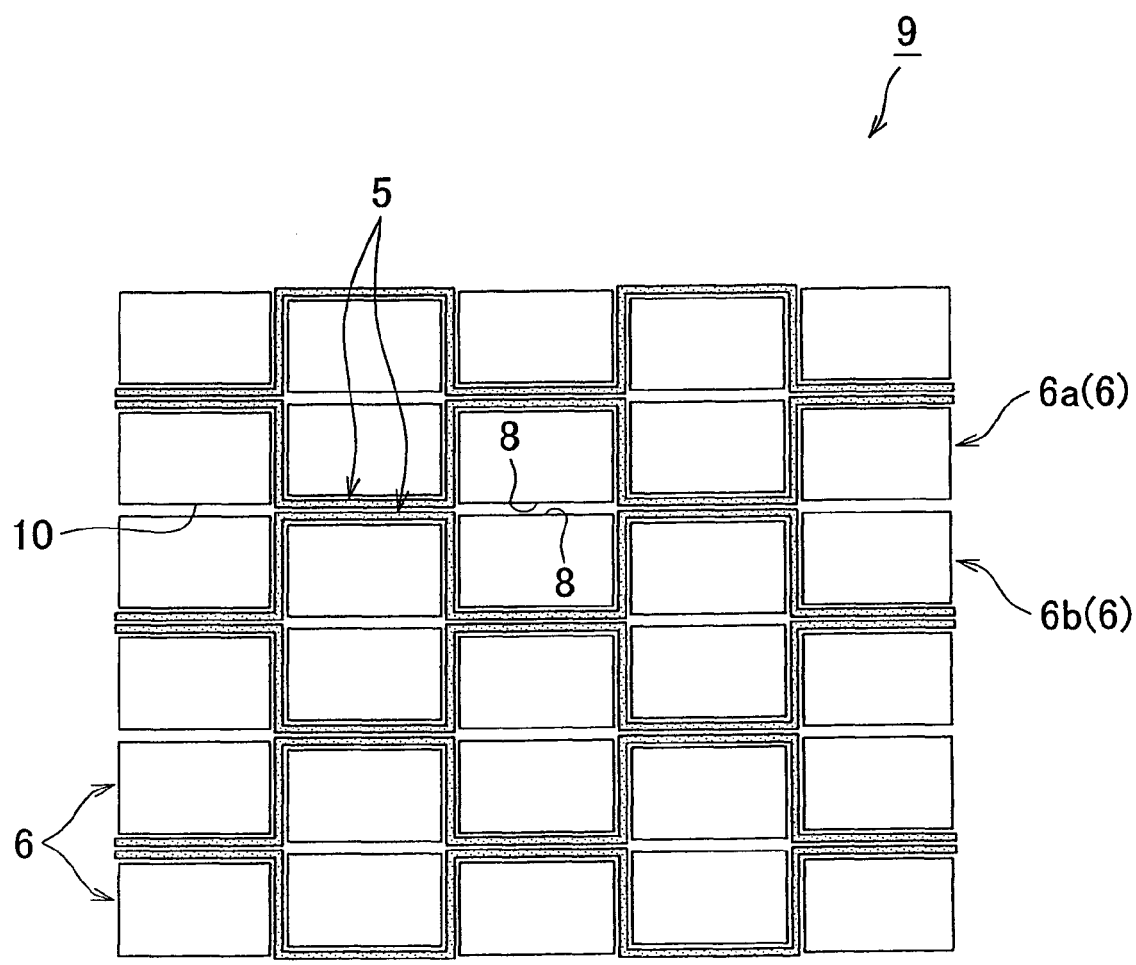
FIG. 5 is a side view of a perform for the manufacturing method for the honeycomb-like structural body shown in FIG. 1.
Figure 6:
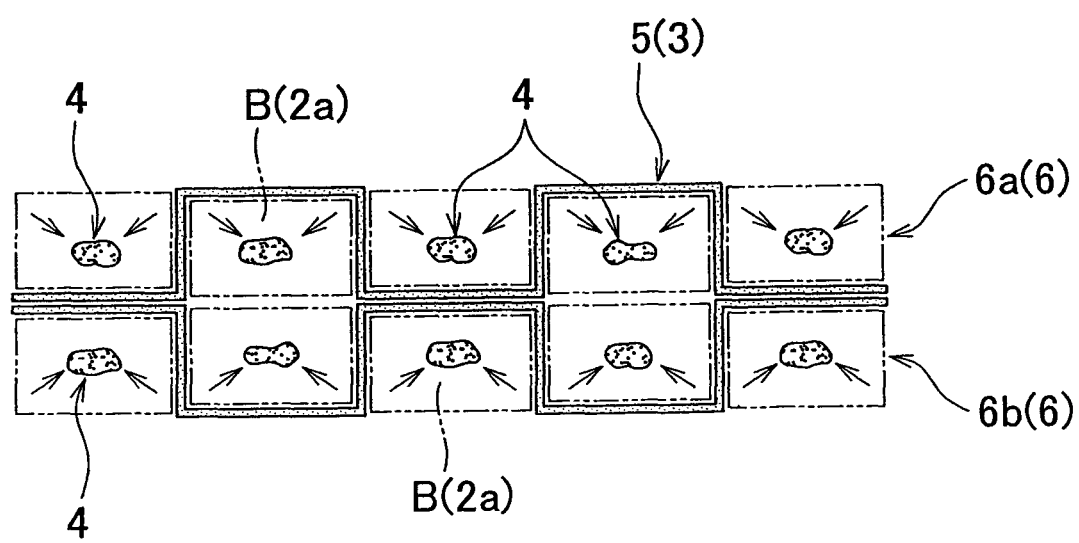
FIG. 6 is a diagram for describing a definitive hardening process in the manufacturing method for the honeycomb-like structural body shown in FIG. 1.

Subsequently, after a plurality of core units 6 are formed by repeatedly performing the foregoing step S2, a predetermined number of core units 6 are stacked to form a preform (stack) 9 (S3), as shown in FIG. 5. The stacking is performed so that adjacent core units 6a and 6b are symmetrical about a stacking surface 10. That is, the core units 6 are stacked so that the exposed side surfaces 8 of the core elements 4 of adjacent core units 6a and 6b face each other. Incidentally, the number of core units stacked herein is twice the number of cell portions that are formed in the stacking direction (the vertical direction in FIG. 5).

Subsequently, the preform 9 is placed in a bag that is formed from a thin film of nylon or the like, and the bag is subjected to vacuum suction to hold an external shape of the preform 9 (S4). Then, while this state is maintained, the preform 9 is placed into a heating furnace, and is heated at a temperature not exceeding 80° C. for a predetermined time. Thus, the preform 9 is brought into a semi-hardened state by preliminarily hardening the prepregs 5 without causing thermal shrinkage of the core elements 4, and adjacent prepregs 5 in contact with each other are allowed to adhere to each other due to their own adhesiveness (S5, which is a preliminary hardening process). In the preliminary hardening process, the preform 9 is heated so that the hardening depth of the prepregs becomes 10% or greater. Incidentally, the "hardening depth" means the extent of progress of hardening, and the percentage of the hardening depth is determined with reference to the hardening depth of a predetermined commercially available prepreg which is considered to be 0%. The hardening depth can be measured with the use of, for example, Microdielectrometer (Eumetric System III) made by Netzsch Geratebau GmbH, with a dedicated sensor (IDEX sensor, for example) attached on a surface of the prepreg. The hardening depth thus obtained is output as Cure-Index in the case of the above Microdielectrometer.

Subsequently, the preform 9 is heated for a predetermined time at a temperature of 120° C. or higher, that is, at a definitive hardening temperature of the prepregs 5. Thus, the prepregs 5 of the preform 9 are definitively hardened, and simultaneously the core elements 4 are allowed to spontaneously thermally shrink, sharply reducing their own volumes (S6, which is a definitive hardening process). As a result, spaces B as cell holes 2a are formed while the shape of the prepregs 5 is kept as the shape of cell walls 3. Thus, a honeycomb-like structural body 1 is manufactured. In this process, cell portions 2 are each defined by the prepregs 5 of two adjacent core units 6a and 6b.

Incidentally, it suffices that the hardening time each of the preliminary hardening process and the definitive hardening process are appropriately set according to the kind of the prepregs 5. For example, in the preliminary hardening process in the first embodiment, the hardening time is preferably set so that the hardening depth becomes 10% or greater.

In the foregoing first embodiment, the preform 9 is heated in the preliminary hardening process in a temperature range whose upper limit is 80° C. in which the core elements 4 does not shrink, so that the prepregs 5 of the preform 9 are semi-hardened. Therefore, the prepregs 5 having undergone the preliminary hardening process exhibit a certain level of rigidity against load (so-called self-stand function). As a result, through the definitive hardening process performed afterwards to definitively harden the prepregs 5 and thermally shrink the core elements, the prepregs 5 are formed into cell walls 3 while the prepregs 5 are not deformed but remain in the ridge-and-groove shape. Simultaneously, the spaces B formed by thermal shrinkage of the core elements 4 can be used as cell holes 2a. Besides, in the first embodiment, since the prepregs 5 are caused to spontaneously adhere to each other in the preliminary hardening process, the need to apply adhesive in a separate process is eliminated.

That is, in the manufacturing method of the first embodiment, the cell portions 2 can be formed to have a desired shape according to the shape of the core elements 4, by providing or defining the shape of the cell portions 2 in an early stage of the manufacturing process. Therefore, the process of expanding the preform 9 and the process of securing separation characteristic of the expansion sites become unnecessary. Therefore, various honeycomb-like structural bodies 1 that vary in the shape of cell portions can easily be manufactured, and therefore a honeycomb-like structural body 1 having a cell portion shape that achieves high energy absorption efficiency can easily be manufactured at low cost.

Besides, in the first embodiment, the preform 9 is heated in the preliminary hardening process so that the hardening depth of the prepregs 5 becomes 10% or greater. In this case, in the later-performed definitive hardening process, the shape of the prepregs 5 can be more certainly kept as the shape of the cell walls 3. Incidentally, if the hardening depth of the prepregs 5 in the preliminary hardening process is less than 10%, the rigidity of the prepregs 5 becomes insufficient, so that, for example, when the core elements 4 thermally shrink in the later-performed definitive hardening process, the prepregs 5 may sometimes deform (lose their shape) due to the thermal shrinkage of the core elements 4.

Besides, in the first embodiment, each core unit 6 is formed by coating a plurality of core elements with the prepreg 5 so that the prepregs 5 assume a wave shape, as described above. Then, a plurality of core units 6 are stacked so as to be symmetrical to each other with respect to stacking surfaces 10. Thus, the preform 9 is formed. Therefore, a honeycomb-like structural body 1 having high structure efficiency can be manufactured without uselessly stacking prepregs 5. In addition, in this case, since uniform cell portions 2 are arranged in a honeycomb fashion with only little deviation, the dimensional variations of the honeycomb-like structural body 1 in the stacking direction can also be reduced.

By the way, in the process of expanding the preform 9 in a related-art manufacturing method, expansion sites may be stuck due to the stickiness of the prepregs 5, so that it may become difficult to perform an intended expansion of the preform 9. Besides, if prepregs 5 are adhered to each other with adhesive to stack them as in a related-art manufacturing method, the adhesive may pass through mesh openings of the prepregs 5, which are made of a mesh-like material, so that it may become difficult to carry out the expansion as required. With this regard, the first embodiment can be said to be effective since the honeycomb-like structural body 1 in the embodiment is manufactured without expanding the preform 9 and without using adhesive.

Besides, in some of the related-art manufacturing methods, bags are inserted between the prepregs 5 stacked, and the bags are inflated to form cell portions 2. In this case, a process of removing the bags is needed after the hardening of the prepregs 5, so that the manufacturing processes become complicated. In contrast, in the first embodiment, the cell portions 2 can be formed merely by thermally shrinking the core elements 4, and there is no need to remove the core elements. Therefore, even in a honeycomb-like structural body that is closely sealed from outside, the cell portions 2 can be formed in a honeycomb fashion inside the structural body.

Second Embodiment

Next, a manufacturing method for a honeycomb-like structural body in accordance with a second embodiment of the invention will be described. In the following description, features and the like of the second embodiment that are different from those of the first embodiment will mainly be described.

Figure 7:
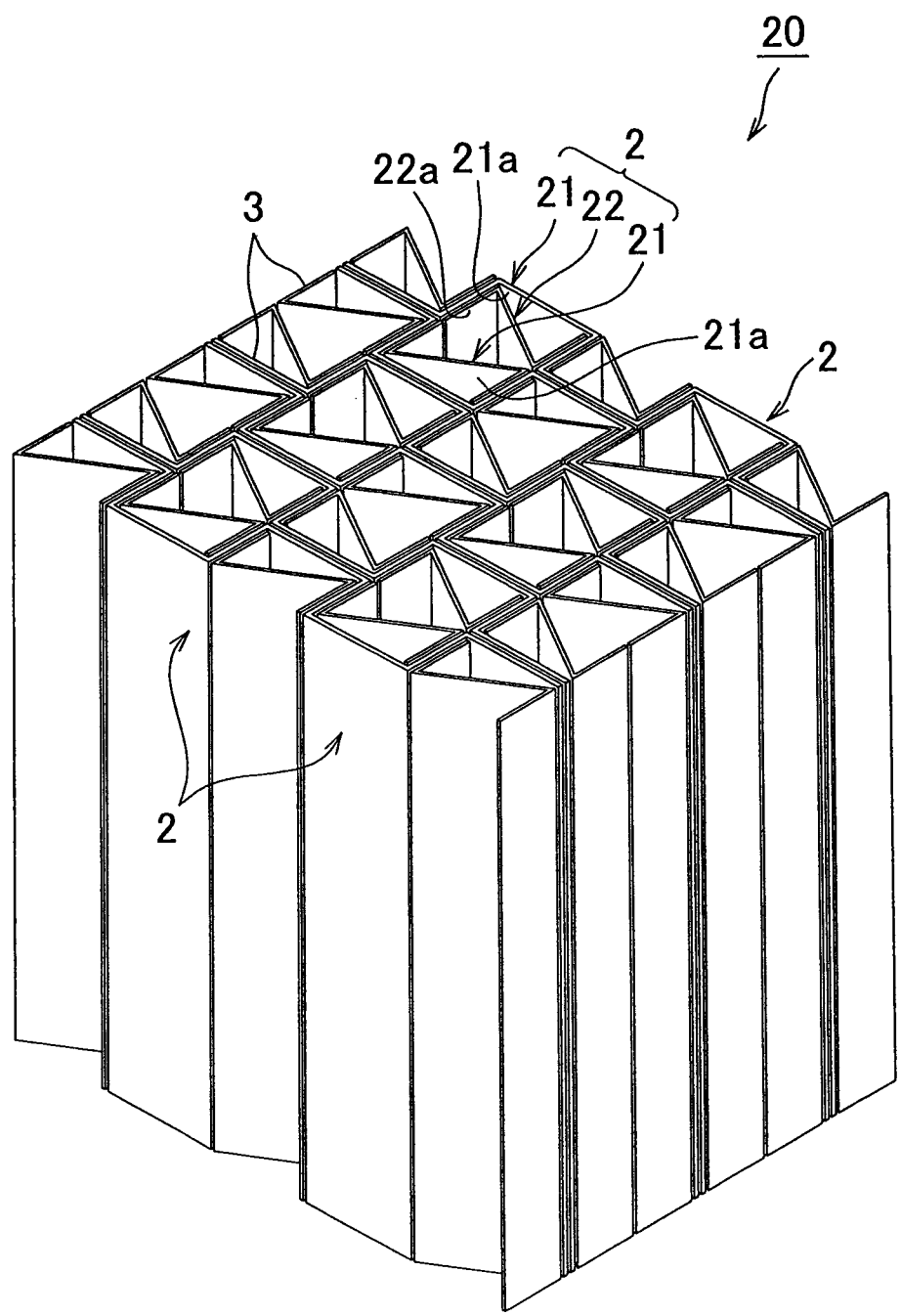
FIG. 7 is a perspective view showing a honeycomb-like structural body that is manufactured by a manufacturing method in accordance with a second embodiment of the invention.
Figure 8:
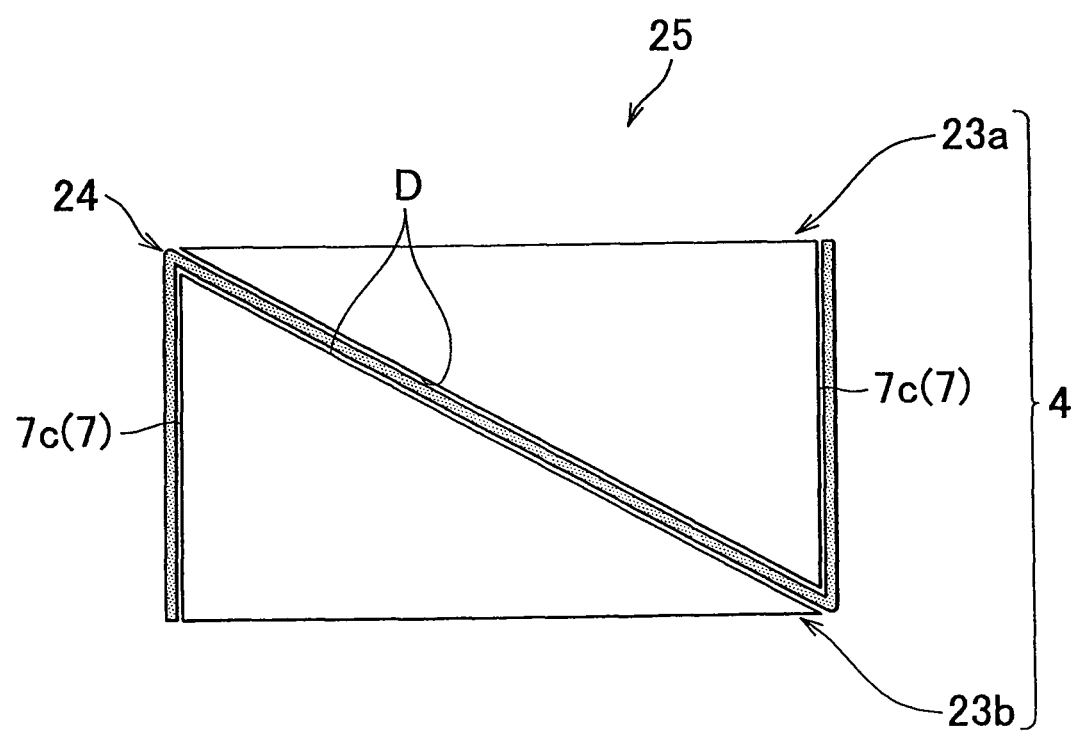
FIG. 8 is a side view showing a coated element in the manufacturing method for the honeycomb-like structural body shown in FIG. 7.

FIG. 7 is a perspective view showing a honeycomb-like structural body manufactured by a manufacturing method in accordance with the second embodiment of the invention. As shown in FIG. 7, the honeycomb-like structural body 20 of the second embodiment differs from the foregoing honeycomb-like structural body 1 in that each cell portion (first cell portion) 2 contains triangular prism-shape cell portions (second cell portions) 21 and 22 that are arranged in the cell portion 2. In each cell portion 21, a cell hole 21a having a right-angled triangular cross-sectional shape is formed. In each cell portion 22, a cell hole 22a having a triangular cross-sectional shape is formed.

Figure 9:
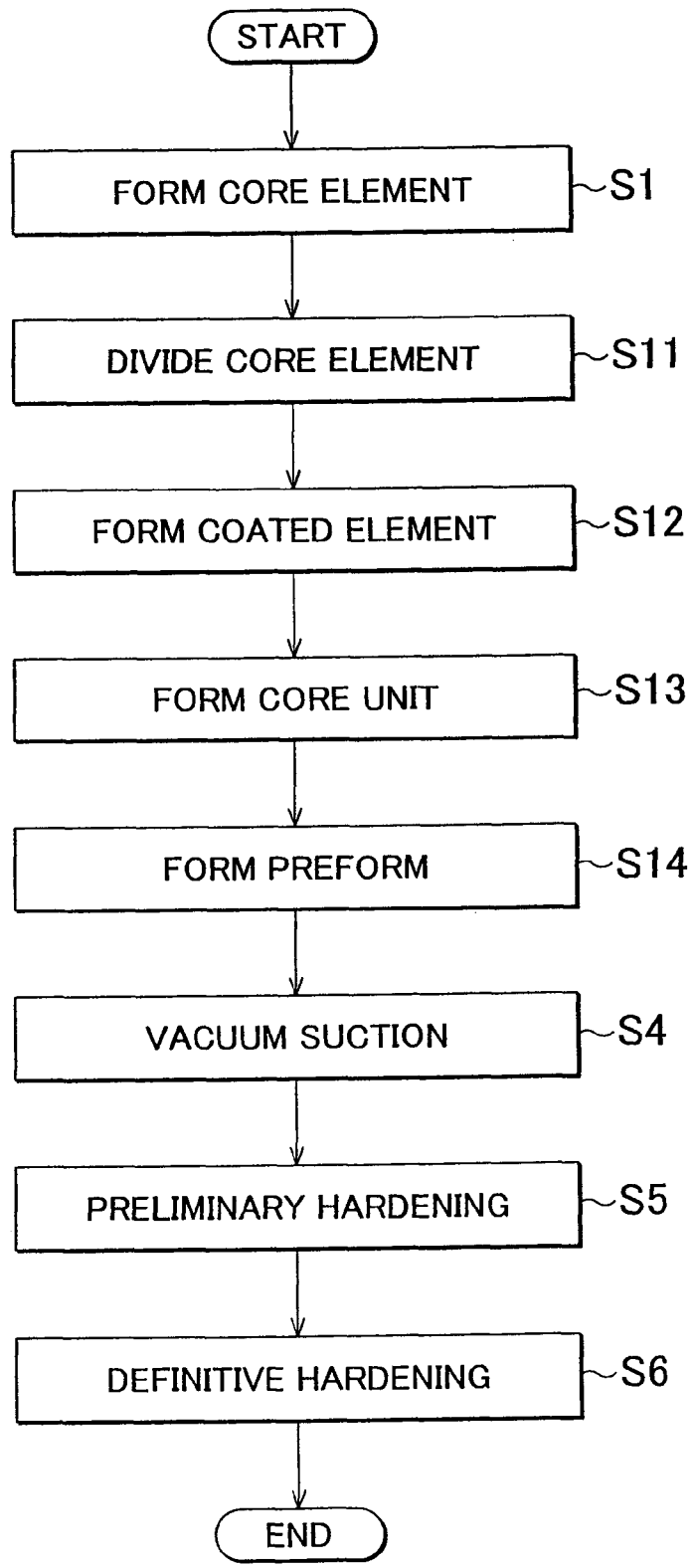
FIG. 9 is a flowchart for describing the manufacturing method for the honeycomb-like structural body shown in FIG. 7.

When the honeycomb-like structural body 20 is to be manufactured, a core element 4, after being formed, is divided into halves along its lengthwise direction, so that the core element 4 is constructed of two triangular prism-shape core elements 23a and 23b (S11 in FIG. 9). The cross-sectional shape of each of the core elements 23a and 23b is a right-angled triangular shape obtained by half-dividing the cross-sectional shape of the core element 4.

Subsequently, a prepreg (first prepreg) 24 is laid as a coat on the core element 4 so as to cover two side surfaces 7c and 7c of the core element 4 that are parallel to each other, and surfaces of the core elements 23a and 23b with which the core elements 23a and 23b face each other. Thus, a coated element 25 in which the core elements 23a and 23b are coated with the prepreg 24 so that the prepreg 24 has a shape of letter Z when viewed in the direction along the surface of the prepreg 24 (S12).

Figure 10:
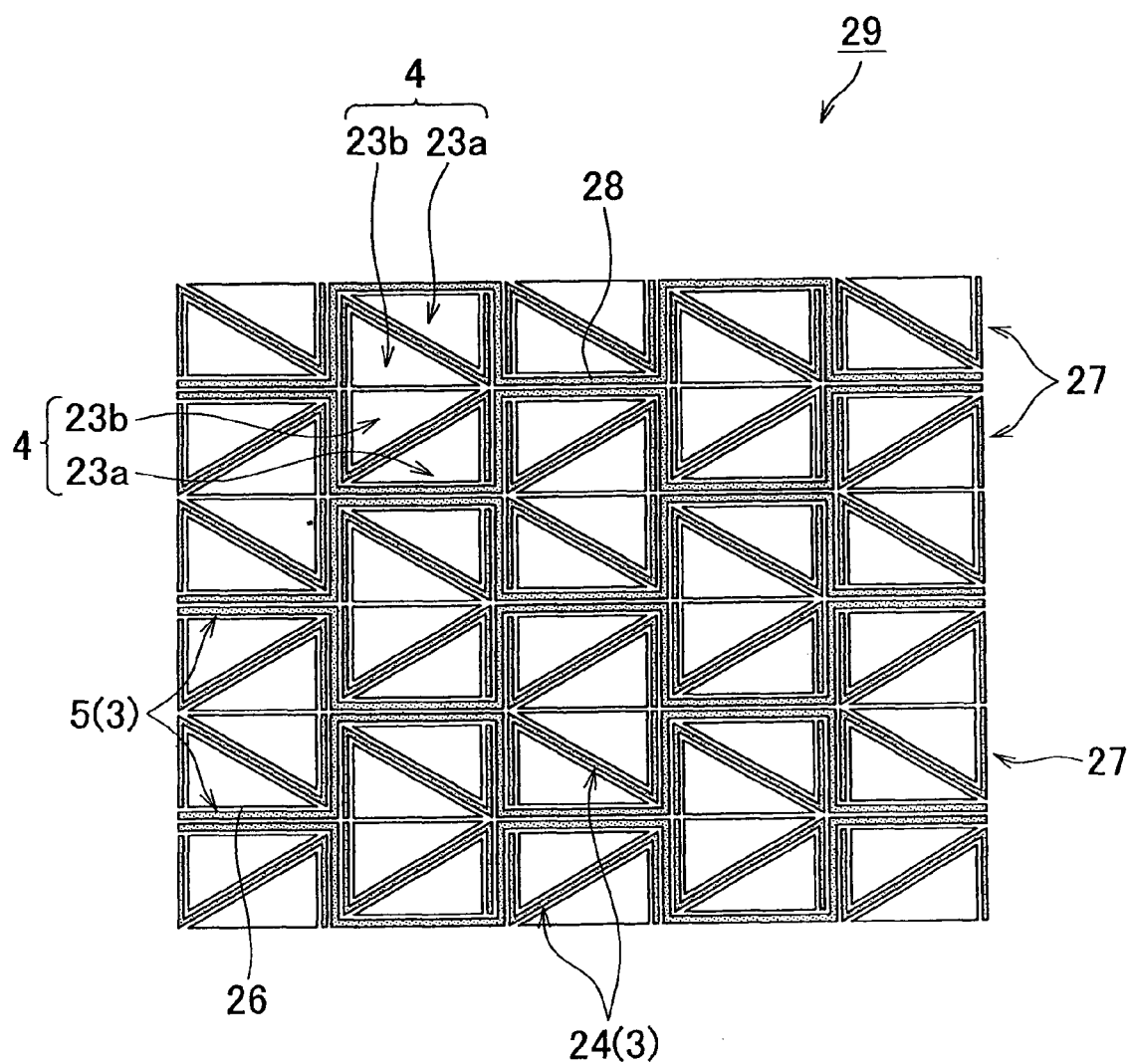
FIG. 10 is a side view of a preform in the manufacturing method for the honeycomb-like structural body shown in FIG. 7.

Subsequently, a plurality of coated elements 25 are formed by repeatedly performing the foregoing step S12. Then, as shown in FIG. 10, side surfaces 26 of a plurality of coated element 25 are coated with a prepreg (second prepreg) 5 so that a core unit 27 is formed (S13).

Subsequently, after a plurality of core units 27 are formed by repeatedly performing the foregoing step S13, these core units 27 are stacked so as to be plane-symmetrical to each other with respect to stacking surfaces 28, thus forming a preform 29 (S14).

After that, by performing the foregoing processes S4 to S6, the prepregs 5 are constructed as cell walls 3 that correspond to first cell walls, and prepregs 24 are constructed as cell walls 3 that correspond to second cell walls. At the same time, spaces formed by the thermal shrinkage of the core elements 23a are constructed as cell holes 21a (see FIG. 7), and spaces formed by the thermal shrinkage of the core elements 23b are constructed as cell holes 22a (see FIG. 7).

Thus, the manufacturing method of the second embodiment also achieves substantially the same effects as the foregoing method of the first embodiment, that is, achieves an effect that various honeycomb-like structural bodies 20 that vary in the shape of cell portions are easily manufactured.

Furthermore, in the second embodiment, since the coated elements 25 that are each formed by coating the core elements 23a and 23b with the prepregs 24 are further coated with the prepregs 5 as described above, the cell portions 21 and 22 are arranged in each cell portion 2. Thus, according to the second embodiment, it becomes possible to easily manufacture a honeycomb-like structural body 20 having cell portions 2 that have a complicated shape. In addition, since the cell portions 2 have a quadrangular prism shape and the cell portions 21 and 22 have a triangular prism shape, the structure efficiency of the honeycomb-like structural body 20 becomes high (see FIG. 7).

While the invention has been described above with reference to the embodiments, the invention is not limited to the foregoing embodiments. For example, although in the foregoing embodiments, the cross-sectional shape of the core elements 4 is quadrangular and the cross-sectional shape of the core elements 23a and 23b is triangular, the cross-sectional shapes thereof may be various polygonal shapes, and may also be circular. In such a case, the cross-sectional shape of cell holes may be various polygonal shapes, or circular.

Besides, although in the foregoing embodiments, the prepregs 5 whose hardening temperature is in the range of 80° C. to 130° C. are used, but the prepregs 5 are not limited so. For example, prepregs whose hardening temperature is in the range of 60° C. to 80° C. may also be used. In that case, the preform is heated in the preliminary hardening process at a temperature within a range whose upper limit is 60° C., and the preform is heated in the definitive hardening process at a temperature of 80° C. or higher.

Besides, although in the foregoing embodiments, the core elements 4 are left remaining in the cell holes 2a after being thermally shrunk, from the viewpoint of easy manufacture of a honeycomb-like structural body, the core elements 4 may also be removed by washing with a solvent or the like. Incidentally, since the core elements are light in weight, leaving the core elements inside does not give rise to a large risk of weight increase of the honeycomb-like structural body and of adverse effect caused by the weight increase.

A working example of the invention will be described below.

Firstly, seven core elements having a quadrangular prism shape were placed side by side, and were coated with a prepreg so that the prepreg came to have a wave shape, thus forming a core unit (see FIG. 3). The core elements used herein were core elements made of a polystyrene foam that had been formed at an expansion ratio of 45 by the beads method, and had a length of 80 mm, a width of 20 mm, and a height of 10 mm. The prepreg used was a prepreg (W3101/Q112J by Toho Tenax Co., Ltd.) containing a carbon fiber, and an epoxy resin as a thermo-hardening resin, and having a hardening temperature of 80° C. to 130° C., and having a width of 80 mm.

Subsequently, the foregoing formation of a core unit was repeatedly carried out to obtain eight core units. The eight core units were stacked so as to be symmetrical to each other with respect to planes, whereby a preform was obtained.

Subsequently, the preform was inserted into a nylon-made bag, and the bag was subjected to vacuum pressure reduction via a vacuum pump, and was kept in that state for 10 minutes. This preform, while being kept in the bag in the vacuumed pressure state, was placed into a heating furnace, and was kept at 80° C. for 5 hours. After that, the preform was kept in the furnace at 130° C. for 1.5 hours, whereby a honeycomb-like structural body was obtained.

In the manufacturing method for the honeycomb-like structural body in the foregoing example, when the preform was heated at a temperature of 80° C., the core elements did not shrink, and the prepregs became semi-hardened. Then, when the preform was heated at the temperature of 130° C., the prepreg was definitively hardened to become cell walls while retaining the ridge-and-groove shape without undergoing deformation. Simultaneously, the core elements thermally shrunk, so that spaces as cell holes were formed. Besides, when the preform was heated at the temperature of 80° C., adjacent prepregs of the preform adhered to each other. This result confirmed the above-stated effects that the cell portions can be formed by providing or defining a desired shape of the cell portions according to the shape of core elements in the manufacturing process, and that various honeycomb-like structural bodies that vary in the shape of cell portions can easily be manufactured.

The invention claimed is:

1. A manufacturing method for a honeycomb-like structural body, wherein the honeycomb-like structural body has a honeycomb-like arrangement of a plurality of cell portions, the method comprising:
   forming a stack by stacking thermo-shrinkable members that are coated with prepregs, the stack including:
      a plurality of first cell portions that are defined by first cell walls of a first prepreg, and that are arranged in a honeycomb pattern; and
      a plurality of second cell portions which are defined by second cell walls of a second prepreg, and at least two of the second cell portions are arranged within each of the first cell portions;
   after forming the stack, preliminarily hardening the prepregs and adhering the prepregs that contact each other by heating the stack at a first temperature; and
   after preliminarily hardening, definitively hardening the prepregs in the stack and shrinking the thereto-shrinkable members by heating the stack at a second temperature that is higher than the first temperature.

2. The manufacturing method according to claim 1, wherein the first temperature is a temperature at which the thereto-shrinkable member does not shrink, and the second temperature is a temperature at which the thermo-shrinkable member shrinks.

3. The manufacturing method according to claim 1, wherein in preliminary hardening, the stack is heated so that a hardening depth of the prepregs is 10% or greater.

4. The manufacturing method according to claim 1, wherein in forming the stack, the stack is formed by forming a plurality of intermediary bodies in which the thermo-shrinkable members disposed side by side are coated with the prepregs so as to form a wave shape, and by stacking the intermediary bodies symmetrically about a plane.

5. The manufacturing method according to claim 4, wherein the thermo-shrinkable members are coated with the prepregs so as to form a ridge-and-groove shape.

6. The manufacturing method according to claim 1, wherein in forming the stack, coated elements are formed by coating the thermo-shrinkable members with the first prepreg, and are coated with the second prepreg, and then are stacked.

7. The manufacturing method according to claim 1, wherein the first cell portions have a quadrangular prism shape, and the second cell portions have a triangular prism shape.

8. A honeycomb-like structural body manufactured by a manufacturing method that comprises:

forming a stack by stacking thermo-shrinkable members that are coated with prepregs, after forming the stack, preliminarily hardening the prepregs and adhering the prepregs that contact each other by heating the stack at a first temperature; and after preliminarily hardening, definitively hardening the prepregs in the stack and shrinking the thermo-shrinkable members by heating the stack at a second temperature that is higher than the first temperature, the honeycomb-like structural body comprising:

a plurality of first cell portions that are defined by first cell walls, and that are arranged in a honeycomb pattern; and a plurality of second cell portions which are defined by second cell walls, and at least two of the second cell portions are arranged within each of the first cell portions.

9. The honeycomb-like structural body according to claim 8, wherein the first cell portions have a quadrangular prism shape, and the second cell portions have a triangular prism shape.

* * * * *